US012767759B2

(12) United States Patent
Lee et al.

(10) Patent No.: US 12,767,759 B2
(45) Date of Patent: Oct. 20, 2026

(54) METHOD FOR PREPARING POLYALKYLENE CARBONATE RESIN

(71) Applicant: LG CHEM, LTD., Seoul (KR)

(72) Inventors: Seung Hee Lee, Daejeon (KR); Sang Kook Kim, Daejeon (KR); Sang Woo Kim, Daejeon (KR); Bo Ra Shin, Daejeon (KR); No Jin Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 602 days.

(21) Appl. No.: 18/277,054

(22) PCT Filed: Sep. 26, 2022

(86) PCT No.: PCT/KR2022/014354
§ 371 (c)(1),
(2) Date: Aug. 11, 2023

(87) PCT Pub. No.: WO2023/054999
PCT Pub. Date: Apr. 6, 2023

(65) Prior Publication Data

US 2024/0141103 A1 May 2, 2024

(30) Foreign Application Priority Data

Sep. 29, 2021 (KR) ........................ 10-2021-0128985

(51) Int. Cl.
*C08G 64/32* (2006.01)
*B01J 27/26* (2006.01)

(52) U.S. Cl.
CPC ............ *C08G 64/323* (2013.01); *B01J 27/26* (2013.01)

(58) Field of Classification Search
CPC ....... C08G 64/02; C08G 64/323; C08G 64/34
See application file for complete search history.

(56) References Cited

U.S. PATENT DOCUMENTS

| | | | | |
|---|---|---|---|---|
| 5,248,833 | A * | 9/1993 | Hinney | C07C 41/44 560/191 |
| 2003/0050187 | A1 | 3/2003 | Schafer et al. | |
| 2010/0081781 | A1 * | 4/2010 | Schubert | C08G 65/2609 528/14 |
| 2011/0087001 | A1 | 4/2011 | Coates et al. | |
| 2013/0184432 | A1 | 7/2013 | Gurtler et al. | |
| 2014/0066591 | A1 | 3/2014 | Coates et al. | |
| 2014/0221602 | A1 * | 8/2014 | Muller | C08G 64/323 528/371 |
| 2015/0353680 | A1 | 12/2015 | Coates et al. | |
| 2019/0202982 | A1 | 7/2019 | Coates et al. | |
| 2019/0382528 | A1 | 12/2019 | Kember et al. | |
| 2020/0062899 | A1 | 2/2020 | Kember et al. | |
| 2023/0100282 | A1 | 3/2023 | Kember et al. | |
| 2024/0368347 | A1 | 11/2024 | Lee et al. | |

FOREIGN PATENT DOCUMENTS

| | | | |
|---|---|---|---|
| CN | 102675620 | A | 9/2012 |
| CN | 105542142 | A | 5/2016 |
| CN | 112625231 | A | 4/2021 |
| CN | 117916020 | A | 4/2024 |
| DE | 10147712 | A1 | 4/2003 |
| JP | 2014-139324 | A | 7/2014 |
| KR | 10-2004-0029087 | A | 4/2004 |
| KR | 10-2013-0102588 | A | 9/2013 |
| KR | 10-2014-0042168 | A | 4/2014 |
| KR | 10-2019-0118193 | A | 10/2019 |
| KR | 10-2019-0118648 | A | 10/2019 |
| WO | 2023-038406 | A1 | 3/2023 |

OTHER PUBLICATIONS

Dong, Journal of Polymer Science Part A: Polymer Chemistry, 2012, 50, 362-370 (Year: 2012).*

* cited by examiner

*Primary Examiner* — Robert C Boyle
(74) *Attorney, Agent, or Firm* — Bryan Cave Leighton Paisner LLP

(57) ABSTRACT

The present disclosure relates to a method for preparing a polyalkylene carbonate resin, and more particularly, to a method for preparing a polyalkylene carbonate resin having the reduced cyclic carbonate content, which is a by-product, and an increased ratio of a repeating unit including carbon dioxide, by increasing catalyst activity.

17 Claims, No Drawings

METHOD FOR PREPARING POLYALKYLENE CARBONATE RESIN

CROSS-REFERENCE TO RELATED APPLICATIONS

The present application is a National Phase entry pursuant to 35 U.S.C. § 371 of International Application No. PCT/KR2022/014354, filed on Sep. 26, 2022, and claims the benefit of and priority to Korean Patent Application No. 10-2021-0128985, filed on Sep. 29, 2021, the entire contents of which are incorporated by reference in their entirety for all purposes as if fully set forth herein.

TECHNICAL FIELD

The present disclosure relates to a method for preparing a polyalkylene carbonate resin having reduced cyclic carbonate content, which is a by-product by increasing catalyst activity and an increased ratio of a repeating unit including carbon dioxide.

BACKGROUND

After industrial revolution, humanity consumes a large amount of fossil fuels to build a modern society but increases the concentration of carbon dioxide in the air by environmental destruction including deforestation. In the way that the increase of the concentration of carbon dioxide becomes a factor of increasing the greenhouse effect, it is important to reduce the concentration in the air of carbon dioxide which has high contribution to global warming, and various studies on the emission regulation and immobilization of carbon dioxide are being conducted.

Recently, a polyalkylene carbonate resin from the polymerization of carbon dioxide and epoxide is in the spotlight as a biodegradable resin. Particularly, a process for preparing a polyalkylene carbonate resin using carbon dioxide may reduce the global warming problems in terms of immobilizing the carbon dioxide in the air and is also actively studied in terms of using as a carbon source.

In order to prepare a polyalkylene carbonate resin, a catalyst is surely required as well as carbon dioxide and epoxide, and as a typical heterogeneous catalyst, a double metal cyanide catalyst composed of a zinc dicarboxylate-based catalyst such as a zinc glutarate catalyst combined with dicarboxylic acid, and a complex of Co, Zn, Al, or the like, is being used.

In the case of the zinc glutarate catalyst, there are advantages of easy synthesis and treatment, but the activity of the catalyst is very low to increase the amount used of the catalyst, and the removal of the catalyst after polymerization reaction is difficult. On the contrary, in the case of the double metal cyanide catalyst, there are problems in that the activity is high, but the ratio of a repeating unit including carbon dioxide in a polyalkylene carbonate resin polymerized is low.

Accordingly, the development of a catalyst showing high catalyst activity and improved immobilizing efficiency of carbon dioxide, simultaneously, and being capable of polymerizing polyalkylene carbonate stably and improving the ratio of a repeating unit including carbon dioxide in polyalkylene carbonate polymerized, is required.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

The present disclosure is to solve the above-described problems and provides a method for preparing a polyalkylene carbonate resin having a high ratio of a repeating unit including carbon dioxide and having reduced cyclic carbonate content, which is a by-product, wherein an alkylene oxide compound and carbon dioxide are polymerized in the presence of a double metal cyanide catalyst including a compound represented by Formula 9 as a complexing agent.

In order to solve the above-described tasks, the present disclosure provides a method for preparing a polyalkylene carbonate resin.

(1) The present disclosure provides a method for preparing a polyalkylene carbonate resin, the method comprising: polymerizing an alkylene oxide compound and carbon dioxide in the presence of a catalyst, wherein the polyalkylene carbonate resin has a glass transition temperature (Tg) of −10° C. to 50° C. and comprises a repeating unit represented by Formula 1 and a repeating unit represented by Formula 2, wherein the catalyst comprises a double metal cyanide compound and a complexing agent, and wherein the complexing agent is a compound represented by the following Formula 9:

[Formula 1]

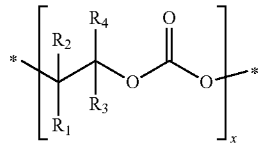

[Formula 2]

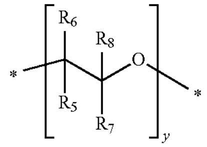

wherein in Formula 1 and Formula 2:

$R_1$ to $R_8$ are each independently hydrogen, a linear alkyl group of 1 to 20 carbon atoms, a branched alkyl group of 3 to 20 carbon atoms, an aryl group of 6 to 20 carbon atoms, an alkenyl group of 2 to 20 carbon atoms, or a cycloalkyl group of 3 to 20 carbon atoms,

* is a connecting part between repeating units, and x and y are mole fractions, where x is 0.70 to 1.00, y is 0.00 to 0.30, and x+y is 1,

[Formula 9]

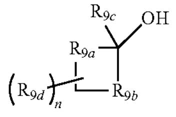

wherein $R_{9a}$ and $R_{9b}$ are each independently a single bond or an alkylene group of 1 to 5 carbon atoms, where at least one among $R_{9a}$ and $R_{9b}$ is an alkylene group of 1 to 5 carbon atoms, $R_{9c}$ and $R_{9a}$ are each independently a hydrogen atom or an alkyl group of 1 to 6 carbon atoms, and n is an integer of 0 to 2.

(2) The present disclosure provides the method for preparing a polyalkylene carbonate resin according to (1), wherein the polymerization step is performed in a temperature range of 30° C. to 120° C.

(3) The present disclosure provides the method for preparing a polyalkylene carbonate resin according to (1) or (2), wherein the polymerization step is performed in a pressure range of 5 bar to 50 bar.

(4) The present disclosure provides the method for preparing a polyalkylene carbonate resin according to any one among (1) to (3), wherein the compound represented by Formula 9 is any one or more selected from the group consisting of cyclobutanol, cyclopentanol, cyclohexanol, cycloheptanol, cyclooctanol, 1-methyl cyclopentanol, 2-methyl cyclopentanol, 3-methyl cyclopentanol, 1-ethyl cyclopentanol, 2-ethyl cyclopentanol, 3-ethyl cyclopentanol, 1-propyl cyclopentanol, 2-propyl cyclopentanol, 3-propyl cyclopentanol, 1-butyl cyclopentanol, 2-butyl cyclopentanol, 3-butyl cyclopentanol, 1-isopropyl cyclopentanol, 2-isopropyl cyclopentanol, 3-isopropyl cyclopentanol, 1-(propan-2-yl) cyclopentanol, 2,2-dimethyl cyclopentanol, 2,3-dimethyl cyclopentanol, 3,3-dimethyl cyclopentanol, 1,2-dimethyl cyclopentanol, 1,3-dimethyl cyclopentanol, 1-methyl cyclohexanol, 1-ethyl cyclohexanol, 1-propyl cyclohexanol, 1-butyl cyclohexanol, 2-methyl-1-cyclohexanol, 2-ethyl-1-cyclohexanol, 3-ethyl-1-cyclohexanol, 4-ethyl-1-cyclohexanol, 2-propy-1-cyclohexanol, 3-propyl-1-cyclohexanol, 4-propyl-1-cyclohexanol, 2-butyl-1-cyclohexanol, 3-butyl-1-cyclohexanol, 4-butyl-1-cyclohexanol, 2-isopropyl-1-cyclohexanol, 3-isopropyl-1-cyclohexanol, 4-isopropyl-1-cyclohexanol, 2-tert-butyl-1-cyclohexanol, 3-tert-butyl-1-cyclohexanol, 4-tert-butyl-1-cyclohexanol, 2,3-dimethyl-1-cyclohexanol, 2,4-dimethyl-1-cyclohexanol, 3,4-dimethyl-1-cyclohexanol, 1-methyl cycloheptanol, 2-methyl cycloheptanol, 3-methyl cycloheptanol and 4-methy cycloheptanol.

(5) The present disclosure provides the method for preparing a polyalkylene carbonate resin according to any one among (1) to (4), wherein the compound represented by Formula 9 is any one or more selected from the group consisting of cyclobutanol, cyclopentanol, cyclohexanol, cycloheptanol and cyclooctanol.

(6) The present disclosure provides the method for preparing a polyalkylene carbonate resin according to any one among (1) to (5), wherein the double metal cyanide compound is derived from a metal cyanide complex and a metal salt.

(7) The present disclosure provides the method for preparing a polyalkylene carbonate resin according to (6), wherein the metal cyanide complex is potassium hexacyanocobaltate(III), potassium hexacyanoferrate(II), potassium hexacyanoferrate(III), calcium hexacyanoferrate(III) or lithium hexacyanoiridate(III).

(8) The present disclosure provides the method for preparing a polyalkylene carbonate resin according to (6), wherein the metal salt is one or more selected from the group consisting of zinc(II) chloride, zinc(III) chloride, zinc bromide, zinc iodide, zinc acetate, zinc acetylacetonate, zinc benzoate, zinc nitrate, iron(II) sulfate, iron(II) bromide, cobalt(II) chloride, cobalt(II) thiocyanate, nickel(II) formate and nickel(II) nitrate.

(9) The present disclosure provides the method for preparing a polyalkylene carbonate resin according to any one among (1) to (8), wherein the catalyst further comprises an auxiliary complexing agent, and the auxiliary complexing agent is a compound having a hydroxyl group, an amine group, an ester group or an ether group at a terminal.

(10) The present disclosure provides the method for preparing a polyalkylene carbonate resin according to any one among (1) to (9), wherein x is 0.90 to 1.00, and y is 0.00 to 0.10.

(11) The present disclosure provides the method for preparing a polyalkylene carbonate resin according to any one among (1) to (10), wherein, in Formula 1 and Formula 2, $R_1$ to $R_8$ are each independently hydrogen, and wherein the glass transition temperature (Tg) of the polyalkylene carbonate resin is 0° C. to 20° C.

(12) The present disclosure provides the method for preparing a polyalkylene carbonate resin according to any one among (1) to (11), wherein, in Formula 1 and Formula 2, $R_1$ to $R_8$ are each independently a linear alkyl group of 1 to 20 carbon atoms, a branched alkyl group of 3 to 20 carbon atoms, an aryl group of 6 to 20 carbon atoms, an alkenyl group of 2 to 20 carbon atoms, or a cycloalkyl group of 3 to 20 carbon atoms, and wherein the glass transition temperature (Tg) of the polyalkylene carbonate resin is 30° C. to 50° C.

(13) The present disclosure provides the method for preparing a polyalkylene carbonate resin according to any one among (1) to (12), wherein in Formula 1, $R_1$ to $R_4$ are each independently hydrogen or a linear alkyl group of 1 to 10 carbon atoms.

(14) The present disclosure provides the method for preparing a polyalkylene carbonate resin according to any one among (1) to (13), wherein the repeating unit represented by Formula 1 is represented by Formula 4 or Formula 5.

[Formula 4]

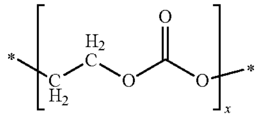

[Formula 5]

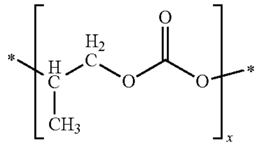

Wherein in Formulas 4 and 5, x and * are the same as defined in Formula 1.

(15) The present disclosure provides the method for preparing a polyalkylene carbonate resin according to any one among (1) to (14), wherein in Formula 2, $R_5$ to $R_8$ are each independently hydrogen or a linear alkyl group of 1 to 10 carbon atoms.

(16) The present disclosure provides the method for preparing a polyalkylene carbonate resin according to any one among (1) to (15), wherein the repeating unit represented by Formula 2 is represented by Formula 7 or Formula 8.

[Formula 7]

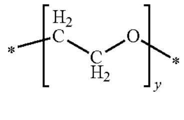

-continued

[Formula 8]

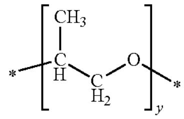

Wherein in Formulas 7 and 8, y and * are the same as defined in Formula 2.

(17) The present disclosure provides the method for preparing a polyalkylene carbonate resin according to any one among (1) to (16), wherein a cyclic carbonate content is from 0.5 wt % to 15.0 wt % based on a total weight of the polyalkylene carbonate resin.

In the method for preparing a polyalkylene carbonate resin according to the present disclosure, an alkylene oxide compound and carbon dioxide are polymerized in the presence of a double metal cyanide catalyst including a compound represented by Formula 9 as a complexing agent, and a polyalkylene carbonate resin having an increased ratio of a repeating unit including carbon dioxide, reduced cyclic carbonate content, which is a by-product, and increased glass transition temperature, may be prepared.

DETAILED DESCRIPTION

It will be understood that words or terms used in the description and claims of the present disclosure shall not be interpreted as the meaning defined in commonly used dictionaries. It will be understood that the words or terms should be interpreted as having a meaning that is consistent with their meaning in the technical idea of the invention, based on the principle that an inventor may properly define the meaning of the words to best explain the invention.

The term “alkyl group” used in the present disclosure may mean a monovalent aliphatic saturated hydrocarbon.

The term “aryl group” used in the present disclosure may mean cyclic aromatic hydrocarbon, and may include both monocyclic aromatic hydrocarbon in which one cycle is formed, and polycyclic aromatic hydrocarbon in which two or more cycles are combined.

The term “alkenyl group” used in the present disclosure may mean monovalent aliphatic unsaturated hydrocarbon containing one or two or more double bonds.

The term “cycloalkyl group” used in the present disclosure may include both cyclic saturated hydrocarbon, and cyclic unsaturated hydrocarbon including one or two or more unsaturated bonds.

Hereinafter, the present disclosure will be explained in more detail.

Method for Preparing Polyalkylene Carbonate

The present disclosure provides a method for preparing a polyalkylene carbonate resin having a glass transition temperature (Tg) of −10° C. to 50° C. and including a repeating unit represented by Formula 1 and a repeating unit represented by Formula 2.

[Formula 1]

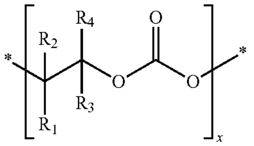

-continued

[Formula 2]

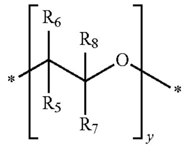

In Formula 1 and Formula 2, $R_1$ to $R_8$ are each independently hydrogen, a linear alkyl group of 1 to 20 carbon atoms, a branched alkyl group of 3 to 20 carbon atoms, an aryl group of 6 to 20 carbon atoms, an alkenyl group of 2 to 20 carbon atoms, or a cycloalkyl group of 3 to 20 carbon atoms,

* means a connecting part between repeating units, x and y are mole fractions, where x is 0.70 to 1.00, y is 0.00 to 0.30, and x+y is 1.

The method for preparing a polyalkylene carbonate resin according to an embodiment of the present disclosure includes a step of polymerizing an alkylene oxide compound and carbon dioxide in the presence of a catalyst, and the catalyst includes a double metal cyanide compound and a complexing agent, and the complexing agent may be a compound represented by Formula 9.

[Formula 9]

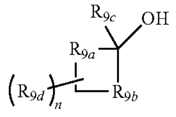

$R_{9a}$ and $R_{9b}$ are each independently a single bond or an alkylene group of 1 to 5 carbon atoms, where at least one among $R_{9a}$ and $R_{9b}$ is an alkylene group of 1 to 5 carbon atoms, $R_{9c}$ and $R_{9d}$ are each independently a hydrogen atom or an alkyl group of 1 to 6 carbon atoms, and n is an integer of 0 to 2.

Generally, the double metal cyanide catalyst uses ethanol, isopropanol, n-butanol, iso-butanol, sec-butanol, tert-butanol, or the like, or a polyalkylene glycol-based material to improve catalyst activity.

Particularly, tert-butanol is the most widely used one for preparing a double metal cyanide catalyst as a complexing agent, but if a polyalkylene carbonate resin is polymerized under a double metal cyanide catalyst prepared using tert-butanol, there are problems in that the ratio of a repeating unit including carbon dioxide in the polyalkylene carbonate resin thus polymerized is low.

In another embodiment, in order to increase the ratio of a repeating unit including carbon dioxide in a polymer obtained by the copolymerization of alkylene oxide and carbon dioxide, a double metal cyanide catalyst including a C2 to C20 unsaturated alcohol that may have a cycloalkyl group as a complexing ligand has been developed and used as a copolymerization catalyst, but the improvement of the ratio of a repeating unit including carbon dioxide in the polymer prepared was insignificant. In another embodiment, a double metal cyanide catalyst including a cyclic polyol has been used as a complexing agent in the copolymer, but in this case, due to the high melting point of the cyclic polyol, the catalyst has a solid state at room temperature and could not be used as a single complexing agent but essentially requires another complexing agent such as tert-butanediol.

In addition, there are problems in that the ratio of the repeating unit including carbon dioxide in the polymer prepared is still not high.

However, the double metal cyanide catalyst of the present disclosure is prepared by using a cycloalkane-type alcohol having a bulky structure as the complexing agent, and the crystal structure of the catalyst may be diverse including cubic, amorphous and monoclinic, and accordingly, effects of suitably controlling the reaction rate of an epoxide compound and carbon dioxide could be shown.

Particularly, the catalyst according to an embodiment of the present disclosure includes a compound represented by Formula 9 as a complexing agent, and in Formula 9, $R_{9a}$ and $R_{9b}$ may be each independently a single bond or an alkylene group of 1 to 3 carbon atoms, where at least one among $R_{9a}$ and $R_{9b}$ is an alkylene group of 1 to 3 carbon atoms, $R_{9c}$ and $R_{9a}$ are each independently a hydrogen atom or an alkyl group of 1 to 4 carbon atoms, and n may be an integer of 0 to 2.

In another embodiment, in Formula 9, $R_{9a}$ and $R_{9b}$ may be each independently a single bond or an alkylene group of 1 to 3 carbon atoms, at least one among $R_{9a}$ and $R_{9b}$ may be an alkylene group of 1 to 3 carbon atoms, $R_{9c}$ may be a hydrogen atom, and n may be 0.

In another embodiment, the complexing agent may be a cycloalkyl alcohol of 3 to 12 carbon atoms, particularly, cycloalkyl alcohol of 4 to 10 carbon atoms, or 5 to 7 carbon atoms.

In another embodiment, the compound represented by Formula 9 may be any one or more selected from the group consisting of cyclobutanol, cyclopentanol, cyclohexanol, cycloheptanol, cyclooctanol, 1-methyl cyclopentanol, 2-methyl cyclopentanol, 3-methyl cyclopentanol, 1-ethyl cyclopentanol, 2-ethyl cyclopentanol, 3-ethyl cyclopentanol, 1-propyl cyclopentanol, 2-propyl cyclopentanol, 3-propyl cyclopentanol, 1-butyl cyclopentanol, 2-butyl cyclopentanol, 3-butyl cyclopentanol, 1-isopropyl cyclopentanol, 2-isopropyl cyclopentanol, 3-isopropyl cyclopentanol, 1-(propan-2-yl) cyclopentanol, 2,2-dimethyl cyclopentanol, 2,3-dimethyl cyclopentanol, 3,3-dimethyl cyclopentanol, 1,2-dimethyl cyclopentanol, 1,3-dimethyl cyclopentanol, 1-methyl cyclohexanol, 1-ethyl cyclohexanol, 1-propyl cyclohexanol, 1-butyl cyclohexanol, 2-methyl-1-cyclohexanol, 2-ethyl-1-cyclohexanol, 3-ethyl-1-cyclohexanol, 4-ethyl-1-cyclohexanol, 2-propy-1-cyclohexanol, 3-propyl-1-cyclohexanol, 4-propyl-1-cyclohexanol, 2-butyl-1-cyclohexanol, 3-butyl-1-cyclohexanol, 4-butyl-1-cyclohexanol, 2-isopropyl-1-cyclohexanol, 3-isopropyl-1-cyclohexanol, 4-isopropyl-1-cyclohexanol, 2-tert-butyl-1-cyclohexanol, 3-tert-butyl-1-cyclohexanol, 4-tert-butyl-1-cyclohexanol, 2,3-dimethyl-1-cyclohexanol, 2,4-dimethyl-1-cyclohexanol, 3,4-dimethyl-1-cyclohexanol, 1-methyl cycloheptanol, 2-methyl cycloheptanol, 3-methyl cycloheptanol and 4-methy cycloheptanol.

In another embodiment, the compound represented by Formula 9 may be any one or more selected from the group consisting of cyclobutanol, cyclopentanol, cyclohexanol, cycloheptanol and cyclooctanol.

In addition, the catalyst includes a double metal cyanide compound, the double metal cyanide compound may be derived from a metal cyanide complex and a metal salt, and the metal cyanide complex may show water-soluble properties. Particularly, the metal cyanide complex may be represented by Formula 10.

$$Y_aM'(CN)_b \quad \text{[Formula 10]}$$

In Formula 10, M' may be one or more selected from the group consisting of Fe(II), Fe(III), Co(II), Co(III), Cr(II), Cr(III), Mn(II), Mn(III), Ir(III), Ni(II), Rh(III), Ru(II), (V) and V(IV), preferably, one or more selected from the group consisting of Co(II), Co(III), Fe(II), Fe(III), Cr(III), Ir(III) and Ni(II). Y may be an alkali metal ion or an alkaline earth metal ion. a is an integer of 1 to 4, b is an integer of 4 to 6, and a and b values may be selected so that the metal cyanide complex achieves electrically neutral.

In another embodiment, the metal cyanide complex may be potassium hexacyanocobaltate(III), potassium hexacyanoferrate(II), potassium hexacyanoferrate(III), calcium hexacyanoferrate(III) or lithium hexacyanoiridate(III), preferably, potassium hexacyanocobaltate(III).

The metal salt may show water-soluble properties. Particularly, the metal salt may be represented by Formula 11.

$$M(X)_n \quad \text{[Formula 11]}$$

In Formula 11, M is a transition metal, preferably, one or more selected from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) and Cr(III), more preferably, one or more selected from the group consisting of Zn(II), Fe(II), Co(II) and Ni(II). X is an anion selected from halide, hydroxide, sulfate, carbonate, cyanide, oxalate, thiocyanate, isocyanate, isothiocyanate, carboxylate and nitrate. The value of n satisfies the valence state of M.

In another embodiment, the metal salt may be zinc(II) chloride, zinc(III) chloride, zinc bromide, zinc iodide, zinc acetate, zinc acetylacetonate, zinc benzoate, zinc nitrate, iron(II) sulfate, iron(II) bromide, cobalt(II) chloride, cobalt (II) thiocyanate, nickel(II) formate, nickel(II) nitrate and mixtures thereof, preferably, zinc(II) chloride, zinc(III) chloride, zinc bromide or zinc iodide.

The catalyst according to the present disclosure may be represented by Formula 12.

$$M^2_p[M^1(CN)_6]_q \cdot dM^2(X)_r \cdot eL \cdot fH_2O \quad \text{[Formula 12]}$$

In Formula 12, $M^1$ and $M^2$ are each independently a transition metal, X is an anion, and L is cyclobutanol, cyclopentanol, cyclohexanol, cycloheptanol, or cyclooctanol. p, q, d, r, e and f are each independently an integer of 1 to 6.

More particularly, the catalyst according to the present disclosure may be represented by Formula 13.

$$Zn_3[Co(CN)_6]_2 \cdot gZnCl_2 \cdot hL \cdot iH_2O \quad \text{[Formula 13]}$$

In Formula 13, L is cyclobutanol, cyclopentanol, cyclohexanol, cycloheptanol, or cyclooctanol, and g, h and i are each independently an integer of 1 to 6.

The catalyst of the present disclosure may further include an auxiliary complexing agent, and the auxiliary complexing agent may be a compound having a hydroxyl group, an amine group, an ester group, or an ether group at a terminal.

The auxiliary complexing agent may improve the activity of the catalyst, and may be, for example, one or more selected from the group consisting of polyacrylamide, poly (acrylamide-co-acrylic acid), polyacrylic acid, poly(acrylic acid-co-maleic acid), polyacrylonitrile, polyalkyl acrylate, polyalkyl methacrylate, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), an oxazoline polymer, polyalkyleneimine, maleic acid, a maleic anhydride copolymer, hydroxyethyl cellulose, polyacetal, glycidyl ether, glycoside, carboxylic ester of polyhydric alcohols, gallic acid, ester and amide.

In addition, the auxiliary complexing agent may be a compound prepared by the ring-opening polymerization of a cyclic ether compound, an epoxy polymer or an oxetane polymer, for example, one or more selected from the group consisting of polyether, polyester, polycarbonate, polyalkylene glycol, polyalkylene glycol sorbitan ester, polyalkylene glycol glycidyl ether.

In addition, the polyalkylene carbonate resin of the present disclosure may be prepared by polymerizing an alkylene oxide compound and carbon dioxide, and the polymerization method is not specifically limited, but preferably, a solution polymerization may be performed. By the solution polymerization, the heat of reaction may be suitably controlled, and the control of the weight average molecular weight or viscosity of the target polyalkylene carbonate resin may be easy.

The catalyst and the alkylene oxide compound may be used in a weight ratio of 1:100 to 1:8000, 1:300 to 1:6000, or 1:1000 to 1:4000. Within the above-described range, effects of showing high catalyst activity, minimizing by-products, and minimizing back-biting phenomena of the polyalkylene carbonate resin prepared due to heat, may be achieved.

In addition, the polymerization of the alkylene oxide compound and carbon dioxide may be performed in a temperature range of 30° C. to 120° C., 40° C. to 110° C. or 50° C. to 100° C. If the above-described range is satisfied, the polymerization time of the alkylene oxide compound and carbon dioxide may be managed within 24 hours, thereby improving preparation productivity.

In addition, the polymerization of the alkylene oxide compound and carbon dioxide may be performed in a pressure range of 5 bar to 50 bar, 10 bar to 40 bar, or 15 bar to 30 bar. If the above-described range is satisfied, effects of high ratio of a repeating unit including carbon dioxide in the polyalkylene carbonate resin prepared and reduction of the by-product of the cyclic carbonate content may be achieved.

The alkylene oxide compound may use one or more compounds selected from the group consisting of alkylene oxide of 2 to 20 carbon atoms, unsubstituted or substituted with halogen or an alkyl group of 1 to 5 carbon atoms; cycloalkylene oxide of 4 to 20 carbon atoms, unsubstituted or substituted with halogen or an alkyl group of 1 to 5 carbon atoms; and styrene oxide of 8 to 20 carbon atoms, unsubstituted or substituted with halogen or an alkyl group of 1 to 5 carbon atoms, for example, one or more compounds selected from the group consisting of ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxy-7-octene, epifluorohydrin, epichlorohydrin, epibromohydrin, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxynorbornene, limonene oxide, dieldrin, 2,3-epoxypropylbenzene, styrene oxide, phenylpropylene oxide, stilbene oxide, chlorostilbene oxide, dichlorostilbene oxide, 1,2-epoxy-3-phenoxypropane, benzyloxymethyl oxirane, glycidyl-methylphenyl ether, chlorophenyl-2,3-epoxypropyl ether, epoxypropyl methoxyphenyl ether, biphenyl glycidyl ether and glycidyl naphthyl ether.

In addition, in the case of performing solution polymerization of the alkylene oxide compound and carbon dioxide, the alkylene oxide compound and a solvent may be mixed, and as the solvent, one or more selected from the group consisting of methylene chloride, ethylene dichloride, trichloroethane, tetrachloroethane, chloroform, acetonitrile, propionitrile, dimethylformamide, N-methyl-2-pyrrolidone, dimethylsulfoxide, nitromethane, 1,4-dioxane, hexane, toluene, tetrahydrofuran, methyl ethyl ketone, methyl amine ketone, methyl isobutyl ketone, acetone, cyclohexanone, trichloroethylene, methyl acetate, vinyl acetate, ethyl acetate, propyl acetate, butyrolactone, caprolactone, nitropropane, benzene, styrene, xylene, and methyl propasol, may be used, and preferably, polymerization reaction may be more effectively carried out by using methylene chloride as the solvent.

The solvent and the alkylene oxide compound may be used in a weight ratio of 1:0.1 to 1:100, 1:1 to 1:100 or 1:1 to 1:10. Within this range, the solvent may suitably act as a reaction medium, and accordingly, the productivity of the polyalkylene carbonate resin may be improved, and effects of minimizing by-products produced during a preparation process may be achieved.

In addition, the polyalkylene carbonate resin prepared by the preparation method according to an embodiment of the present disclosure may have a glass transition temperature (Tg) of −10° C. to 50° C., and may include a repeating unit represented by Formula 1 and a repeating unit represented by Formula 2.

Hereinafter, the polyalkylene carbonate rein obtained by the preparation method will be explained in more particular.

The polyalkylene carbonate resin prepared by the preparation method according to an embodiment of the present disclosure has a glass transition temperature (Tg) of −10° C. to 50° C., and includes a repeating unit represented by Formula 1 and a repeating unit represented by Formula 2.

[Formula 1]

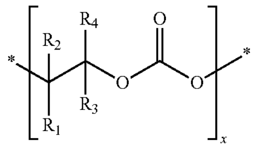

[Formula 2]

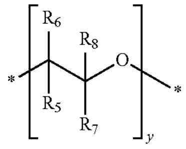

In Formula 1 and Formula 2, $R_1$ to $R_8$ are each independently hydrogen, a linear alkyl group of 1 to 20 carbon atoms, a branched alkyl group of 3 to 20 carbon atoms, an aryl group of 6 to 20 carbon atoms, an alkenyl group of 2 to 20 carbon atoms, or a cycloalkyl group of 3 to 20 carbon atoms, * means a connecting part between repeating units, and x and y are mole fractions, where x is 0.70 to 1.00, y is 0.00 to 0.30, and x+y is 1.

In addition, the "branched alkyl group" may mean all showing branched type in a bonded state of a branched alkyl group.

In addition, x may be 0.80 to 1.00, and y may be 0.00 to 0.20, preferably, x may be 0.90 to 1.00, and y may be 0.00 to 0.10. If the above-described range is satisfied, the fixing ratio of carbon dioxide is high, the reduction of greenhouse effects is effective, and the biodegradation properties thereof are advantageous. In addition, if the polyalkylene carbonate resin according to the present disclosure is manufactured into a film, low oxygen transmittance may be shown, and excellent effects of barrier properties may be achieved.

The polyalkylene carbonate resin may include a polyethylene carbonate resin, a polypropylene carbonate resin, a polypentene carbonate resin, a polyhexene carbonate resin, a polyoctene carbonate resin, a polycyclohexene carbonate resin, or copolymers thereof. In addition, in Formula 1, $R_1$ to $R_8$ may be each independently hydrogen, a linear alkyl group of 1 to 20 carbon atoms, a branched alkyl group of 3 to 20 carbon atoms, an aryl group of 6 to 20 carbon atoms, an alkenyl group of 2 to 20 carbon atoms, or a cycloalkyl group of 3 to 20 carbon atoms, and may finally suitably selected considering the physical properties of a resin desired to finally obtain.

In addition, the repeating unit represented by Formula 1 may be represented by Formula 3.

[Formula 3]

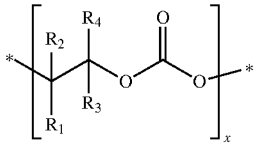

In Formula 1, $R_1$ to $R_4$ are each independently hydrogen or a linear alkyl group of 1 to 10 carbon atoms, and x and * are the same as defined in Formula 1.

More particularly, the repeating unit represented by Formula 1 may be represented by Formula 4 or Formula 5.

[Formula 4]

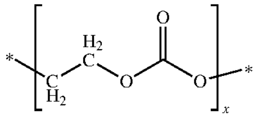

[Formula 5]

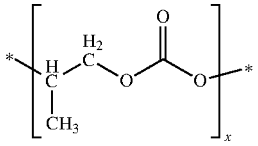

In Formulas 4 and 5, x and * are the same as defined in Formula 1.

In addition, the repeating unit represented by Formula 2 may be represented by Formula 6.

[Formula 6]

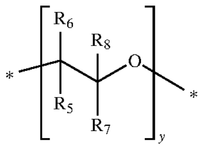

In Formula 6, $R_5$ to $R_8$ are each independently hydrogen or a linear alkyl group of 1 to 10 carbon atoms, and y and * are the same as defined in Formula 2.

More particularly, the repeating unit represented by Formula 2 may be represented by Formula 7 or Formula 8.

[Formula 7]

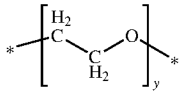

[Formula 8]

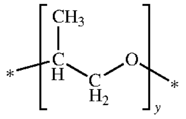

In Formulas 7 and 8, y and * are the same as defined in Formula 2.

The polyalkylene carbonate resin of the present disclosure has a glass transition temperature (Tg) of −10° C. to 50° C., 0° C. to 50° C. or 10° C. to 50° C. If the above-described range is satisfied, the processability of the polyalkylene carbonate resin at room temperature may be excellent.

In another embodiment, the polyalkylene carbonate resin wherein $R_1$ to $R_8$ in Formula 1 and Formula 2 are each independently hydrogen, may have a glass transition temperature (Tg) of 0° C. to 20° C. or 0° C. to 15° C.

In another embodiment, the polyalkylene carbonate resin wherein $R_1$ to $R_8$ in Formula 1 and Formula 2 are each independently a linear alkyl group of 1 to 20 carbon atoms, a branched alkyl group of 3 to 20 carbon atoms, an aryl group of 6 to 20 carbon atoms, an alkenyl group of 2 to 20 carbon atoms, or a cycloalkyl group of 3 to 20 carbon atoms, may have a glass transition temperature (Tg) of 30° C. to 50° C. or 35° C. to 50° C.

In addition, the cyclic carbonate content may be 0.5 wt % to 15.0 wt %, 0.5 wt % to 10.0 wt %, or 0.5 wt % to 5.0 wt % based on the total weight of the polyalkylene carbonate resin of the present disclosure. If the above-described range is satisfied, defects of deteriorating the glass transition temperature due to cyclic carbonate which acts as a softening agent, may be minimized, and effects of excellent physical properties may be achieved.

The cyclic carbonate content may be measured by dissolving 10 mg of a polyalkylene carbonate resin specimen in a chloroform-$d_6$ solvent using $^1$H-NMR spectrometer (500 MHz Spectrometer, Jeol Co.). Particularly, from the results measured by the $^1$H-NMR spectrometer, a peak around 4.5 ppm that is a cyclic carbonate peak, was confirmed, and by using a carbonate peak area and an ether peak area values, the cyclic carbonate content may be calculated as Equation 1.

[Equation 1]

$$\frac{(A/N)}{(A/N)[(B+C)/(1-CO_2\ \text{content})]}$$

$$\frac{A/N}{(A/N)\{(B+C)/(1-CO_2\ \text{content})\}}$$

In Equation 1, A, B, C, N and $CO_2$ content may be defined as follows.

A=cyclic carbonate peak area, B=carbonate peak area, C=ether peak area, N=[alkylene oxide molar mass/(44+alkylene oxide molar mass)], $CO_2$ content=(mole fraction of carbonate unit×44)/[(mole fraction of carbonate unit×44)+(alkylene oxide molar mass×100)]

Hereinafter, the present disclosure will be explained in particular through particular embodiments. However, the embodiments below are only for illustrating the present disclosure, and the scope of the present disclosure is not limited thereby.

Preparation Example of Double Metal Cyanide Catalyst

Preparation Example 1

In a first beaker with a volume of 500 ml, 11.45 g of zinc chloride, 30 ml of distilled water and 39 g of cyclohexanol were mixed to prepare a first mixture solution. In a second beaker with a volume of 250 ml, 4 g of potassium hexacyanocobaltate was dissolved in 100 ml of distilled water to prepare a second mixture solution. In a third beaker with a volume of 100 ml, 5 g of polypropylene glycol (Mw=3,000) and 23 g of cyclohexanol were dissolved in 2 ml of distilled water to prepare a third mixture solution. By using a mechanical stirrer, the second mixture solution was added dropwisely to the first mixture solution at 25° C. for 1 hour, and the third mixture solution was injected at once, followed by reacting for 1 hour. Then, a mixture product was separated by using a high-speed centrifuge, and a precipitate separated was washed twice using a mixture of 70 ml of distilled water and 70 ml of cyclohexanol. Then, additional washing was performed using 140 ml of cyclohexanol, and the precipitate thus washed was dried in a vacuum oven of 80° C. for 12 hours to finally obtained 6.2 g of a double metal cyanide catalyst.

Preparation Example 2

The same method as in Preparation Example 1 was performed except for using cyclopentanol instead of cyclohexanol in Preparation Example 1 to finally obtain 6.0 g of a double metal cyanide catalyst.

Comparative Preparation Example 1

The same method as in Preparation Example 1 was performed except for using tert-butanol instead of cyclohexanol in Preparation Example 1 to finally obtain 6.5 g of a double metal cyanide catalyst.

Comparative Preparation Example 2

The same method as in Preparation Example 1 was performed except for using 2-methyl-3-butene-2-ol instead of cyclohexanol in Preparation Example 1 to finally obtain 6.5 g of a double metal cyanide catalyst.

Comparative Preparation Example 3

The same method as in Preparation Example 1 was performed except for using 1,5-cyclooctanediol instead of cyclohexanol in Preparation Example 1 to finally obtain 6.5 g of a double metal cyanide catalyst.

EXAMPLES

Example 1

To a high-pressure reactor, 10 mg of the double metal cyanide catalyst prepared in Preparation Example 1, 20 g of ethylene oxide and the same amount of a methylene chloride solvent as the ethylene oxide were added. Then, carbon dioxide was injected into the reactor at a flow rate of 36 L/min and a pressure of 30 bar was applied. Polymerization reaction was carried out at 65° C. for 12 hours, and unreacted carbon dioxide was removed after finishing the reaction. Then, the product was diluted in 200 ml of a methylene chloride solvent, unreacted ethylene oxide was removed using a vacuum evaporation method, and drying was performed in a vacuum oven of 40° C. for 12 hours to finally obtain 24.3 g of a polyethylene carbonate resin.

Example 2

The same method as in Example 1 was performed except for using propylene oxide instead of the ethylene oxide in Example 1, to finally obtain 32.29 g of a polypropylene carbonate resin.

Example 3

The same method as in Example 1 was performed except for performing the polymerization reaction at 85° C. instead of 65° C. in Example 1, to finally obtain 25.6 g of a polyethylene carbonate resin.

Example 4

The same method as in Example 3 was performed except for using propylene oxide instead of the ethylene oxide in Example 3, to finally obtain 30.5 g of a polypropylene carbonate resin.

Example 5

The same method as in Example 1 was performed except for performing the polymerization reaction at 105° C. instead of 65° C. in Example 1, to finally obtain 22.8 g of a polyethylene carbonate resin.

Example 6

The same method as in Example 5 was performed except for using propylene oxide instead of ethylene oxide in Example 5, to finally obtain 23.2 g of a polypropylene carbonate resin.

Example 7

The same method as in Example 3 was performed except for using the double metal cyanide catalyst prepared in Preparation Example 2 instead of the double metal cyanide catalyst prepared in Preparation Example 1 in Example 3, to finally obtain 30.0 g of a polyethylene carbonate resin.

Example 8

The same method as in Example 7 was performed except for using propylene oxide instead of ethylene oxide and performing the polymerization reaction at 105° C. instead of 85° C. in Example 7, to finally obtain 30.7 g of a polyethylene carbonate resin.

Comparative Example 1

The same method as in Example 1 was performed except for using the double metal cyanide catalyst prepared in Comparative Preparation Example 1 instead of the double metal cyanide catalyst prepared in Preparation Example 1 in Example 1, to finally obtain 8.15 g of a polyethylene carbonate resin.

Comparative Example 2

The same method as in Comparative Example 1 was performed except for using propylene oxide instead of ethylene oxide in Comparative Example 1, to finally obtain 10.2 g of a polypropylene carbonate resin.

Comparative Example 3

The same method as in Comparative Example 1 was performed except for performing the polymerization reaction at 85° C. instead of 65° C. in Comparative Example 1, to finally obtain 11.7 g of polyethylene carbonate.

Comparative Example 4

The same method as in Comparative Example 3 was performed except for using propylene oxide instead of ethylene oxide in Comparative Example 3, to finally obtain 23.6 g of a polypropylene carbonate resin.

Comparative Example 5

The same method as in Comparative Example 1 was performed except for performing the polymerization reaction at 105° C. instead of 65° C. in Comparative Example 1, to finally obtain 13.4 g of polyethylene carbonate.

Comparative Example 6

The same method as in Comparative Example 5 was performed except for using propylene oxide instead of ethylene oxide in Comparative Example 5, to finally obtain 23.2 g of a polypropylene carbonate resin.

Comparative Example 7

The same method as in Example 3 was performed except for using the double metal cyanide catalyst prepared in Comparative Preparation Example 2 instead of the double metal cyanide catalyst prepared in Preparation Example 1 in Example 3, to finally obtain 12.1 g of a polyethylene carbonate resin.

Comparative Example 8

The same method as in Example 3 was performed except for using the double metal cyanide catalyst prepared in Comparative Preparation Example 3 instead of the double metal cyanide catalyst prepared in Preparation Example 1 in Example 3, to finally obtain an effective amount of a polyethylene carbonate resin.

Experimental Example 1

The type of alkylene oxide compounds and the composition of catalysts used in Examples 1 to 8 and Comparative Examples 1 to 8, and the polymerization temperatures of polyalkylene carbonate resins are shown in Table 1. In addition, the activity of the catalysts used in Examples 1 to 8 and Comparative Examples 1 to 8 was measured and shown in Table 1 below. In addition, the mole fraction of the carbonate unit and glass transition temperature of the polyalkylene carbonate resins obtained in Examples 1 to 8 and Comparative Examples 1 to 8 were measured and shown in Table 1 and Table 2 below.

* Catalyst activity (g-polymer/g-catalyst): The weight of the polyalkylene carbonate resin polymerized and the amount used of the catalyst were measured. By using the measured values, catalyst activity was calculated as in Equation 2 below.

Catalyst activity (g-polymer/g-catalyst)=weight (g) of polyalkylene carbonate resin polymerized/amount (g) used of catalyst [Equation 2]

* mole fraction (mol %) of carbonate unit: By using $^1$H-NMR spectrometer (500 MHz Spectrometer, Jeol Co.), 10 mg of a polyalkylene carbonate resin specimen obtained from each of Examples 1 to 6 and Comparative Examples 1 to 4 was dissolved in a chloroform-$d_6$ solvent, and then, measured. From the measurement results, it was confirmed that a carbonate peak was shown around 3.2-3.9 ppm and an ether peak was shown around 4.2 ppm. By using the carbonate peak area and the ether peak area values, the mole fraction of a carbonate unit was calculated as in Equation 3 below.

Mole fraction of carbonate unit (mol %)=[(area of carbonate peak)/(area of carbonate peak+area of ether peak)]×100 [Equation 3]

* Glass transition temperature (° C.): With respect to the polyalkylene carbonate resins obtained from Examples 1 to 8 and Comparative Examples 1 to 8, differential scanning calorimetry (DSC) analysis was performed. Particularly, the analysis was performed using the Q20 system of TA Instrument Co., under a $N_2$ flow atmosphere, while elevating the temperature from −40° C. to 200° C. with a temperature elevating rate of 10° C./min, and the glass transition temperature was confirmed from the resultant values of a DSC thermogram.

TABLE 1

| Division | Catalyst composition | Alkylene oxide compound | Polymerization temperature (° C.) | Catalyst activity (g-polymer/g-catalyst) | Carbonate unit (mol %) | Glass transition temperature (° C.) |
|---|---|---|---|---|---|---|
| Example 1 | CH[1] + PPG[2] | EO[3] | 65 | 2430 | 92 | 12 |
| Example 3 | CH + PPG | EO | 85 | 2560 | 87 | 6 |
| Example 5 | CH + PPG | EO | 105 | 2280 | 86 | 7 |
| Example 7 | CP[5] + PPG | EO | 85 | 3000 | 86 | 8 |
| Comparative Example 1 | TBA[6] + PPG | EO | 65 | 815 | 65 | −12 |
| Comparative Example 3 | TBA + PPG | EO | 85 | 1170 | 41 | −28 |
| Comparative | TBA + PPG | EO | 105 | 1340 | 18 | −46 |

TABLE 1-continued

| Division | Catalyst composition | Alkylene oxide compound | Polymerization temperature (° C.) | Catalyst activity (g-polymer/g-catalyst) | Carbonate unit (mol %) | Glass transition temperature (° C.) |
|---|---|---|---|---|---|---|
| Example 5 | | | | | | |
| Comparative Example 7 | MBO[7)] + PPG | EO | 85 | 1210 | 42 | −26 |
| Comparative Example 8 | COD[8)] + PPG | EO | 85 | 0 | — | — |

[1)]CH: cyclohexanol
[2)]PPG: polypropylene glycol
[3)]EO: ethylene oxide
[5)]CP: cyclopentanol
[6)]TBA: tert-butanol
[7)]MBO: 2-methyl-3-butene-2-ol
[8)]COD: 1,5-cyclooctanediol

TABLE 2

| Division | Catalyst composition | Alkylene oxide compound | Polymerization temperature (° C.) | Catalyst activity (g-polymer/g-catalyst) | Carbonate unit (mol %) | Glass transition temperature (° C.) |
|---|---|---|---|---|---|---|
| Example 2 | CH[1)] + PPG[2)] | PO[4)] | 65 | 3229 | 97 | 47 |
| Example 4 | CH + PPG | PO | 85 | 3050 | 93 | 44 |
| Example 6 | CH + PPG | PO | 105 | 2320 | 92 | 43 |
| Example 8 | CP[5)] + PPG | PO | 105 | 3070 | 94 | 39 |
| Comparative Example 2 | TBA + PPG | PO | 65 | 1020 | 65 | 25 |
| Comparative Example 4 | TBA + PPG | PO | 85 | 2360 | 56 | 4 |
| Comparative Example 6 | TBA + PPG | PO | 105 | 2320 | 38 | 7 |

[1)]CH: cyclohexanol
[2)]PPG: polypropylene glycol
[4)]PO: propylene oxide
[5)]CP: cyclopentanol
6) TBA: tert-butanol As shown in Table 1 and Table 2, in the cases of Examples 1 to 8, preparing resins by using double metal cyanide catalysts including the compound represented by Formula 9 as a complexing agent, showed increased glass transition temperatures and increased molar ratios of the carbonate units in the polyalkylene carbonate polymerized by 1.34 times to 5.22 times in contrast to Comparative Examples 1 to 8, preparing the same polyalkylene carbonate resins using the same alkylene oxide.

Experimental Example 2

The processability properties of the polyalkylene carbonate resins of the Examples and Comparative Examples were compared and analyzed. The processability properties were confirmed by manufacturing films and pellets, and the results are shown in Table 3 and Table 4 below.

(1) Film Processability

Films were manufactured using the resins, and the processability was evaluated according to the forming degrees of the films.

In this case, the film was manufactured by putting 4 g of each polyalkylene carbonate resin on a hot press pre-heated to 180° C., compressing with 1 MPa for 5 minutes, and then, compressing with 5 MPa for 1 minute. A case of manufacturing a uniform and flat film is represented by 0, and a case of manufacturing not a uniform and flat film but a film adhere to the press is represented by X.

(2) Pellet Processability

Pellets were manufactured using the resins, and processability was evaluated by an anti-blocking test.

Each resin was pelletized using BA-PLA (Bautech Co.), and 300 g of the pelletized polyalkylene carbonate resin was put in a 1 L-size polyethylene bag and stood at room temperature for 24 hours. When taking out of the bag, a case of showing no blocking phenomenon was designated by 0, a case of showing easy separation with grip strength was designated by A, and a case of showing no separation with grip strength was designated by X.

TABLE 3

| Division | Film processability | Pellet processability |
|---|---|---|
| Example 1 | ○ | Δ |
| Example 3 | ○ | Δ |
| Example 5 | ○ | Δ |
| Example 7 | ○ | Δ |
| Comparative Example 1 | X | X |
| Comparative Example 3 | X | X |
| Comparative Example 5 | X | X |
| Comparative Example 7 | X | X |
| Comparative Example 8 | — | — |

TABLE 4

| Division | Film processability | Pellet processability |
|---|---|---|
| Example 2 | ○ | ○ |
| Example 4 | ○ | ○ |
| Example 6 | ○ | ○ |
| Example 8 | ○ | ○ |
| Comparative Example 2 | ○ | Δ |
| Comparative Example 4 | ○ | Δ |
| Comparative Example 6 | ○ | Δ |

As shown in Table 3, it was confirmed that the polyethylene carbonate resins of the Examples all showed markedly excellent film properties and pellet properties in contrast to the polyethylene carbonate resins of the Comparative Examples.

In addition, as shown in Table 4, it was confirmed that the polypropylene carbonate resins of the Examples all showed markedly excellent film properties and pellet properties in contrast to the polypropylene carbonate resins of the Comparative Examples.

The invention claimed is:

1. A method for preparing a polyalkylene carbonate resin, the method comprising:

polymerizing an alkylene oxide compound and carbon dioxide in the presence of a catalyst, wherein the polyalkylene carbonate resin has a glass transition temperature (Tg) of −10° C. to 50° C. and comprises a repeating unit represented by Formula 1 and a repeating unit represented by Formula 2, wherein the catalyst comprises a double metal cyanide compound and a complexing agent, and wherein the complexing agent is a compound represented by the following Formula 9:

[Formula 1]

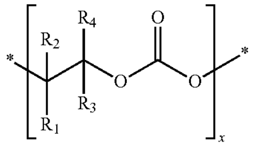

[Formula 2]

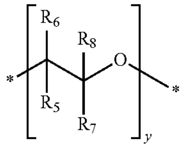

wherein in Formula 1 and Formula 2:

$R_1$ to $R_8$ are each independently hydrogen, a linear alkyl group of 1 to 20 carbon atoms, a branched alkyl group of 3 to 20 carbon atoms, an aryl group of 6 to 20 carbon atoms, an alkenyl group of 2 to 20 carbon atoms, or a cycloalkyl group of 3 to 20 carbon atoms,

* is a connecting part between repeating units, and x and y are mole fractions, where x is 0.70 to 1.00, y is 0.00 to 0.30, and x+y is 1,

[Formula 9]

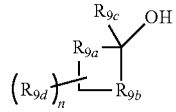

wherein $R_{9a}$ and $R_{9b}$ are each independently a single bond or an alkylene group of 1 to 5 carbon atoms, where at least one among $R_{9a}$ and $R_{9b}$ is an alkylene group of 1 to 5 carbon atoms, $R_{9c}$ and $R_{9d}$ are each independently a hydrogen atom or an alkyl group of 1 to 6 carbon atoms, and n is an integer of 0 to 2.

2. The method for preparing a polyalkylene carbonate resin according to claim 1, wherein the polymerizing is performed in a temperature range of 30° C. to 120° C.

3. The method for preparing a polyalkylene carbonate resin according to claim 1, wherein the polymerizing is performed in a pressure range of 5 bar to 50 bar.

4. The method for preparing a polyalkylene carbonate resin according to claim 1, wherein the compound represented by Formula 9 is any one or more selected from the group consisting of cyclobutanol, cyclopentanol, cyclohexanol, cycloheptanol, cyclooctanol, 1-methyl cyclopentanol, 2-methyl cyclopentanol, 3-methyl cyclopentanol, 1-ethyl cyclopentanol, 2-ethyl cyclopentanol, 3-ethyl cyclopentanol, 1-propyl cyclopentanol, 2-propyl cyclopentanol, 3-propyl cyclopentanol, 1-butyl cyclopentanol, 2-butyl cyclopentanol, 3-butyl cyclopentanol, 1-isopropyl cyclopentanol, 2-isopropyl cyclopentanol, 3-isopropyl cyclopentanol, 1-(propan-2-yl) cyclopentanol, 2,2-dimethyl cyclopentanol, 2,3-dimethyl cyclopentanol, 3,3-dimethyl cyclopentanol, 1,2-dimethyl cyclopentanol, 1,3-dimethyl cyclopentanol, 1-methyl cyclohexanol, 1-ethyl cyclohexanol, 1-propyl cyclohexanol, 1-butyl cyclohexanol, 2-methyl-1-cyclohexanol, 2-ethyl-1-cyclohexanol, 3-ethyl-1-cyclohexanol, 4-ethyl-1-cyclohexanol, 2-propy-1-cyclohexanol, 3-propyl-1-cyclohexanol, 4-propyl-1-cyclohexanol, 2-butyl-1-cyclohexanol, 3-butyl-1-cyclohexanol, 4-butyl-1-cyclohexanol, 2-isopropyl-1-cyclohexanol, 3-isopropyl-1-cyclohexanol, 4-isopropyl-1-cyclohexanol, 2-tert-butyl-1-cyclohexanol, 3-tert-butyl-1-cyclohexanol, 4-tert-butyl-1-cyclohexanol, 2,3-dimethyl-1-cyclohexanol, 2,4-dimethyl-1-cyclohexanol, 3,4-dimethyl-1-cyclohexanol, 1-methyl cycloheptanol, 2-methyl cycloheptanol, 3-methyl cycloheptanol and 4-methyl cycloheptanol.

5. The method for preparing a polyalkylene carbonate resin according to claim 1, wherein the compound represented by Formula 9 is any one or more selected from the group consisting of cyclobutanol, cyclopentanol, cyclohexanol, cycloheptanol and cyclooctanol.

6. The method for preparing a polyalkylene carbonate resin according to claim 1, wherein the double metal cyanide compound is derived from a metal cyanide complex and a metal salt.

7. The method for preparing a polyalkylene carbonate resin according to claim 6, wherein the metal cyanide complex is potassium hexacyanocobaltate(III), potassium hexacyanoferrate(II), potassium hexacyanoferrate(III), calcium hexacyanoferrate(III) or lithium hexacyanoiridate(III).

8. The method for preparing a polyalkylene carbonate resin according to claim 6, wherein the metal salt is one or more selected from the group consisting of zinc(II) chloride, zinc(III) chloride, zinc bromide, zinc iodide, zinc acetate, zinc acetylacetonate, zinc benzoate, zinc nitrate, iron(II)

sulfate, iron(II) bromide, cobalt(II) chloride, cobalt(II) thiocyanate, nickel(II) formate and nickel(II) nitrate.

9. The method for preparing a polyalkylene carbonate resin according to claim 1, wherein:

the catalyst further comprises an auxiliary complexing agent, and the auxiliary complexing agent is a compound having a hydroxyl group, an amine group, an ester group or an ether group at a terminal.

10. The method for preparing a polyalkylene carbonate resin according to claim 1, wherein x is 0.90 to 0.95, and y is 0.05 to 0.10.

11. The method for preparing a polyalkylene carbonate resin according to claim 1, wherein, in Formula 1 and Formula 2, $R_1$ to $R_8$ are each independently hydrogen, and wherein the glass transition temperature (Tg) of the polyalkylene carbonate resin is 0° C. to 20° C.

12. The method for preparing a polyalkylene carbonate resin according to claim 1, wherein, in Formula 1 and Formula 2, $R_1$ to $R_8$ are each independently a linear alkyl group of 1 to 20 carbon atoms, a branched alkyl group of 3 to 20 carbon atoms, an aryl group of 6 to 20 carbon atoms, an alkenyl group of 2 to 20 carbon atoms, or a cycloalkyl group of 3 to 20 carbon atoms, and wherein the glass transition temperature (Tg) of the polyalkylene carbonate resin is 30° C. to 50° C.

13. The method for preparing a polyalkylene carbonate resin according to claim 1, wherein in Formula 1, $R_1$ to $R_4$ are each independently hydrogen or a linear alkyl group of 1 to 10 carbon atoms.

14. The method for preparing a polyalkylene carbonate resin according to claim 1, wherein the repeating unit represented by Formula 1 is represented by the following Formula 4 or Formula 5:

[Formula 4]

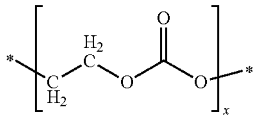

-continued

[Formula 5]

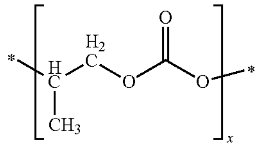

wherein in Formulas 4 and 5, x and * are the same as defined in Formula 1.

15. The method for preparing a polyalkylene carbonate resin according to claim 1, wherein in Formula 2, $R_5$ to $R_8$ are each independently hydrogen or a linear alkyl group of 1 to 10 carbon atoms.

16. The method for preparing a polyalkylene carbonate resin according to claim 1, wherein the repeating unit represented by Formula 2 is represented by the following Formula 7 or Formula 8:

[Formula 7]

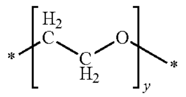

[Formula 8]

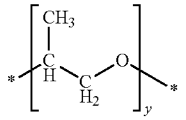

wherein in Formulas 7 and 8, y and * are the same as defined in Formula 2.

17. The method for preparing a polyalkylene carbonate resin according to claim 1, wherein a cyclic carbonate content is from 0.5 wt % to 15.0 wt % based on a total weight of the polyalkylene carbonate resin.

* * * * *